US009621081B2

(12) United States Patent
Kawai et al.

(10) Patent No.: US 9,621,081 B2
(45) Date of Patent: Apr. 11, 2017

(54) MOTOR-DRIVEN APPARATUS AND METHOD FOR DRIVING THE SAME

(71) Applicant: MAKITA CORPORATION, Anjo-shi, Aichi (JP)

(72) Inventors: Yuki Kawai, Anjo (JP); Yoshitaka Ichikawa, Anjo (JP); Hirokatsu Yamamoto, Anjo (JP); Ying Yang, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 0 days.

(21) Appl. No.: 14/978,697

(22) Filed: Dec. 22, 2015

(65) Prior Publication Data
US 2016/0190960 A1 Jun. 30, 2016

(30) Foreign Application Priority Data
Dec. 26, 2014 (JP) ................ 2014-266176

(51) Int. Cl.
| H02P 27/04 | (2016.01) |
| H02P 6/00 | (2016.01) |
| H02P 6/14 | (2016.01) |
| H02P 27/08 | (2006.01) |
| H02P 6/15 | (2016.01) |

(52) U.S. Cl.
CPC .............. *H02P 6/002* (2013.01); *H02P 6/001* (2013.01); *H02P 6/14* (2013.01); *H02P 6/157* (2016.02); *H02P 27/08* (2013.01); *H02P 2201/03* (2013.01)

(58) Field of Classification Search
CPC .... H02P 6/00; H02P 6/14; H02P 21/00; H02P 27/08; H02P 23/00; H02P 25/00; H02P 27/00; H02P 6/18; H02P 6/24

USPC .... 318/139, 400.01, 400.02, 400.14, 400.15, 318/400.32, 400.34, 700, 701, 721, 779, 318/799, 800, 801, 430, 432, 437, 599, 318/811; 363/21.1, 40, 45, 95, 120, 174, 363/175

See application file for complete search history.

(56) References Cited

U.S. PATENT DOCUMENTS

| 6,538,404 B2 * | 3/2003 | Kato ................. H02M 7/53871 318/139 |
| 2013/0147440 A1 | 6/2013 | Shiroyama et al. |
| 2014/0001993 A1 | 1/2014 | Iwata et al. |

FOREIGN PATENT DOCUMENTS

| JP | 2012196725 A | 10/2012 |
| WO | 2012/127851 A2 | 9/2012 |

OTHER PUBLICATIONS

Jun. 3, 2016 Extended European Search Report issued in European Patent Application No. 15202710.8.

* cited by examiner

*Primary Examiner* — Antony M Paul
(74) *Attorney, Agent, or Firm* — Oliff PLC

(57) ABSTRACT

A motor-driven apparatus in one aspect of the present disclosure includes: a brushless motor; a full-wave rectifier circuit; a drive circuit; a controller; and a forcible stop unit. The forcible stop unit performs a forcible stop control to temporarily forcibly stop a switching operation of a plurality of switching elements during a stop period when a full-wave rectified voltage is smaller than an induced voltage generated by a plurality of coils, and the switching operation of the plurality of switching elements is to be stopped.

12 Claims, 9 Drawing Sheets

FIG. 7

CONVERSION TABLE

- POWER SUPPLY CYCLE : 1/50 SECONDS(50Hz)
- MAXIMUM VALUE OF POWER SUPPLY VOLTAGE:140V(AC100V)

| MOTOR ROTATION NUMBER N | PERMISSION SWITCHING TIME T1 | PROHIBITION SWITCHING TIME T2 |
|---|---|---|
| 0≦N≦N1 | T1a | T2a |
| N1<N≦N2 | T1b | T2b |
| N2<N≦N3 | T1c | T2c |
| N3<N≦N4 | T1d | T2d |
| ⋮ | ⋮ | ⋮ |

※ T1a<T1b<T1c<T1d<⋯
※ T2a>T2b>T2c>T2d>⋯

- POWER SUPPLY CYCLE : 1/60 SECONDS(60Hz)
- MAXIMUM VALUE OF POWER SUPPLY VOLTAGE:140V(AC100V)

| MOTOR ROTATION NUMBER N | PERMISSION SWITCHING TIME T1 | PROHIBITION SWITCHING TIME T2 |
|---|---|---|
| 0≦N≦N1 | ⋯ | ⋯ |
| N1<N≦N2 | ⋯ | ⋯ |
| ⋮ | ⋮ | ⋮ |

- POWER SUPPLY CYCLE : 1/50 SECONDS(50Hz)
- MAXIMUM VALUE OF POWER SUPPLY VOLTAGE:300V(AC220V)

| MOTOR ROTATION NUMBER N | PERMISSION SWITCHING TIME T1 | PROHIBITION SWITCHING TIME T2 |
|---|---|---|
| 0≦N≦N1 | ⋯ | ⋯ |
| N1<N≦N2 | ⋯ | ⋯ |
| ⋮ | ⋮ | ⋮ |

⋮

MOTOR-DRIVEN APPARATUS AND METHOD FOR DRIVING THE SAME

CROSS-REFERENCE TO RELATED APPLICATIONS

This application claims the benefit of Japanese Patent Application No. 2014-266176 filed Dec. 26, 2014 in the Japan Patent Office, the disclosure of which is incorporated herein by reference.

BACKGROUND

The present disclosure relates to a motor-driven apparatus that includes a brushless motor and is configured to operate by receiving power supply from an alternating-current power source.

Japanese Unexamined Patent Application Publication No. 2012-196725 discloses an electric power tool that includes a brushless motor and operates by receiving power supply from an alternating-current power source. In the electric power tool, an alternating-current voltage from the alternating-current power source is full-wave rectified, and then is smoothed. The smoothed voltage (pulsating voltage) is supplied to an inverter circuit, and supplied to the brushless motor through a switching operation of the inverter circuit, to thereby rotate the brushless motor.

SUMMARY

In the aforementioned electric power tool, a full-wave rectified alternating-current voltage is smoothed to a pulsating voltage having a minimum value that is smaller than an induced voltage generated by the brushless motor. Accordingly, a period when the pulsating voltage is smaller than the induced voltage occurs periodically while the brushless motor is driven. Since the induced voltage is larger than the pulsating voltage during the period, the pulsating voltage is not applied to the brushless motor even if the inverter circuit performs the switching operation.

In the aforementioned electric power tool, however, the inverter circuit continues to perform the switching operation even during the period when the pulsating voltage is smaller than the induced voltage. The switching operation during the period does not contribute to driving of the brushless motor; thus, continuation of the switching operation during the period will result in wasteful power consumption.

In one aspect of the present disclosure, it is preferable to efficiently drive a brushless motor of a motor-driven apparatus, while reducing power consumption of the motor-driven apparatus.

A motor-driven apparatus in one aspect of the present disclosure comprises: a brushless motor, a full-wave rectifier circuit; a drive circuit; a controller; and a forcible stop unit. The brushless motor comprises a plurality of phases and a plurality of coils. Each of the plurality of coils corresponds to a different one of the plurality of phases. The full-wave rectifier circuit full-wave rectifies an alternating-current power supply voltage that is supplied by an alternating-current power source provided external to the motor-driven apparatus to thereby generate a full-wave rectified voltage and output the full-wave rectified voltage to a supply path to the plurality of coils. The drive circuit comprises a plurality of switching elements provided on the supply path, and is coupled to the full-wave rectifier circuit through the supply path. The drive circuit applies the full-wave rectified voltage outputted to the supply path to the plurality of coils through a switching operation of the plurality of switching elements. The controller performs a switching control to execute the switching operation of the plurality of switching elements when a drive instruction is inputted to the motor-driven apparatus, to thereby drive the brushless motor. The forcible stop unit performs a forcible stop control to temporarily forcibly stop the switching operation of the plurality of switching elements during a stop period when the full-wave rectified voltage is smaller than an induced voltage generated by the plurality of coils, and the switching operation of the plurality of switching elements is to be stopped.

According to the motor-driven apparatus configured as mentioned above, even when the drive instruction is inputted (that is, when the switching control is to be performed), the switching operation is temporarily forcibly stopped while the full-wave rectified voltage is smaller than the induced voltage, and does not contribute to driving of the brushless motor; accordingly, it is possible to reduce power consumption and efficiently drive a brushless motor.

The motor-driven apparatus may comprise a first obtainment unit and a second obtainment unit. The first obtainment unit obtains a voltage value in the supply path, and obtains rectified voltage information representing the full-wave rectified voltage at least on the basis of the obtained voltage value. The second obtainment unit obtains induced voltage information representing the induced voltage that is applied to the supply path.

In the motor-driven apparatus configured as mentioned above, the forcible stop unit may perform the forcible stop control on the basis of the rectified voltage information obtained by the first obtainment unit and the induced voltage information obtained by the second obtainment unit.

In the motor-driven apparatus, the rectified voltage information that is necessary to determine whether the full-wave rectified voltage is smaller than the induced voltage is obtained by the first obtainment unit. This enables the forcible stop unit to stop the switching operation during an appropriate time period. Accordingly, efficient driving of the brushless motor can be achieved, while reducing power consumption.

The first obtainment unit may obtain the voltage value of any specified point that is not affected by the induced voltage in the supply path. In this case, by obtaining the voltage value of the specified point that is not affected by the induced voltage, the forcible stop unit can stop the switching operation during a more appropriate time period.

The first obtainment unit may comprise another full-wave rectifier circuit configured to full-wave rectify the power supply voltage to generate another full-wave rectified voltage, but not to apply the another full-wave rectified voltage to the supply path. In this case, the forcible stop unit may obtain a value of the another full-wave rectified voltage as the rectified voltage information, and to perform the forcible stop control on the basis of the obtained rectified voltage information and the induced voltage information obtained by the second obtainment unit.

According to the motor-driven apparatus as described above, it is possible to obtain the rectified voltage information with high accuracy that is not affected by the induced voltage of the brushless motor using the another full-wave rectifier circuit. That is, a value of the full-wave rectified voltage outputted from the full-wave rectifier circuit can be substantially directly obtained. Thus, the stop period can be set appropriately.

The first obtainment unit may comprise a zero-cross detector and a maximum value detector. The zero-cross detector detects a zero-cross point of the full-wave rectified voltage included in the rectified voltage information. The maximum value detector detects a rectified voltage maximum value included in the rectified voltage information. The rectified voltage maximum value is a maximum value of the full-wave rectified voltage when the brushless motor is not rotating. Further, the forcible stop unit may comprise a cycle calculator configured to calculate a cycle of the power supply voltage on the basis of the zero-cross point detected by the zero-cross detector. In this case, the forcible stop unit may perform the forcible stop control on the basis of the cycle calculated by the cycle calculator, the rectified voltage maximum value detected by the maximum value detector, and the induced voltage information obtained by the second obtainment unit.

By detecting the cycle of the power supply voltage and the rectified voltage maximum value, both of which are physical quantities that depend on the full-wave rectified voltage, the full-wave rectified voltage can be estimated. Thus, the stop period can be set appropriately on the basis of the cycle of the power supply voltage and the rectified voltage maximum value, or on the basis of an estimated value of the full-wave rectified voltage estimated based on the cycle of the power supply voltage and the rectified voltage maximum value.

The second obtainment unit may comprise a rotation speed detector configured to detect a rotation speed of the brushless motor, and an induced voltage calculator configured to calculate a value of the induced voltage on the basis of the rotation speed detected by the rotation speed detector. In this case, the forcible stop unit may perform the forcible stop control on the basis of the rectified voltage information obtained by the first obtainment unit and the value of the induced voltage calculated by the induced voltage calculator.

The motor-driven apparatus configured as mentioned above enables calculation of the value of the induced voltage at lower costs. Thus, the stop period can be set appropriately while reducing costs.

The second obtainment unit may comprise a phase voltage combination unit configured to parallelly combine respective voltages on respective paths from the drive circuit to the plurality of coils, and to output a phase voltage combined value, which is a value of the combined voltage. In this case, the forcible stop unit may be configured to obtain, as the induced voltage information, the phase voltage combined value outputted from the phase voltage combination unit in the stop period each time the stop period starts. The forcible stop unit also may recognize a stop cancellation timing on the basis of the obtained induced voltage information, stop the forcible stop control at the stop cancellation timing, and subsequently recognize a stop execution timing on the basis of the induced voltage information obtained before the stop cancellation timing, and perform the forcible stop control at the stop execution timing. The stop cancellation timing is a timing when the full-wave rectified voltage becomes equal to or more than the induced voltage and the forcible stop control is to be stopped. The stop execution timing is a timing when the full-wave rectified voltage becomes lower than the induced voltage and the forcible stop control is to be performed.

The motor-driven apparatus configured as mentioned above enables direct detection of the value of the induced voltage generated by the plurality of coils using the phase voltage combination unit. That is, the value of the induced voltage can be detected with high accuracy. Thus, the stop period can be set appropriately on the basis of the value of the induced voltage detected with high accuracy.

The first obtainment unit may be configured to output a full-wave rectified signal, which is an analog signal having a voltage value that corresponds to the value of the full-wave rectified voltage represented by the rectified voltage information. The second obtainment unit may be configured to output an induced voltage signal, which is an analog signal having a voltage value that corresponds to the value of the induced voltage represented by the induced voltage information. In this case, the motor-driven apparatus may further comprise a comparator circuit configured to compare the voltage value of the full-wave rectified signal and the voltage value of the induced voltage signal, and to output a signal indicating a comparison result. The forcible stop unit may perform the forcible stop control on the basis of the signal outputted from the comparator circuit.

The motor-driven apparatus configured as mentioned above enables recognition of the stop period by hardware processing, specifically comparison processing of analog signals using a comparator circuit. Thus, the stop period can be set easily and accurately.

The first obtainment unit may be configured to generate full-wave rectified data, which is a digital value indicating the value of the full-wave rectified voltage represented by the rectified voltage information. The second obtainment unit may be configured to generate induced voltage data, which is a digital value indicating the value of the induced voltage represented by the induced voltage information. In this case, the forcible stop unit may comprise a data comparison unit to compare the value indicated by the full-wave rectified data and the value indicated by the induced voltage data, and may perform the forcible stop control on the basis of a comparison result by the data comparison unit.

The motor-driven apparatus configured as mentioned above enables achievement of a function of the data comparison unit by software processing, and enables downsizing and reduction in cost of the motor-driven apparatus.

The motor-driven apparatus may comprise a table to determine stop period information representing the stop period in one cycle of the power supply voltage on the basis of the rectified voltage information and the induced voltage information, the table storing the rectified voltage information and the induced voltage information in association with the stop period information. In this case, the forcible stop unit may obtain the stop period information that is associated with the rectified voltage information and the induced voltage information on the basis of the table, and may perform the forcible stop control in accordance with the stop period information.

In this case, the first obtainment unit may comprise a zero-cross detector configured to detect a zero-cross point of the full-wave rectified voltage included in the rectified voltage information. The table may include at least a cancellation execution period and a stop execution period as the stop period information. The cancellation execution period is a time period from the zero-cross point of the full-wave rectified voltage until a timing to cancel forcible stop of the switching operation. The stop execution period is a time period until a timing to perform forcible stop of the switching operation again after the cancellation execution period has elapsed since the zero-cross point of the full-wave rectified voltage. The forcible stop unit may obtain the cancellation execution period and the stop execution period that are associated with the rectified voltage information and the induced voltage information in the table each time the zero-cross point is detected by the zero-cross detector, and may perform the forcible stop control on the basis of the obtained cancellation execution period and stop execution period using the detected zero-cross point as a starting point.

With this configuration, the cancellation execution period and the stop execution period can be easily obtained using the table. Thus, the stop period can be set easily with a low processing load.

Another aspect of the present disclosure is a method for driving a motor-driven apparatus with a brushless motor, in which the brushless motor comprises a plurality of phases and a plurality of coils, each of the plurality of coils corresponding to a different one of the plurality of phases. The method comprises: obtaining an alternating-current power supply voltage from an alternating-current power source provided external to the motor-driven apparatus; full-wave rectifying the obtained power supply voltage to generate a full-wave rectified voltage; outputting the full-wave rectified voltage to a supply path to the plurality of coils; switching a plurality of switching elements provided on the supply path such that the full-wave rectified voltage is applied to the plurality of coils through the plurality of switching elements when a drive instruction is inputted to the motor-driven apparatus; and temporarily stopping the switching of the plurality of switching elements during a stop period when the full-wave rectified voltage is smaller than an induced voltage generated by the plurality of coils and the switching of the plurality of switching elements is to be stopped.

According to the method as described above, even when the drive instruction is inputted to the motor-driven apparatus (that is, when the switching control is to be performed), the switching operation is temporarily forcibly stopped during a period when the full-wave rectified voltage is smaller than the induced voltage and does not contribute to the driving of the brushless motor. Thus, power consumption of the motor-driven apparatus can be reduced, and the brushless motor can be driven efficiently.

BRIEF DESCRIPTION OF THE DRAWINGS

Exemplary embodiments of the present disclosure will now be described by way of example with reference to the accompanying drawings, in which:

FIG. 7 is an explanatory view showing an example of a conversion table;

DETAILED DESCRIPTION OF THE PREFERRED EMBODIMENTS

First Embodiment

Figure 1:
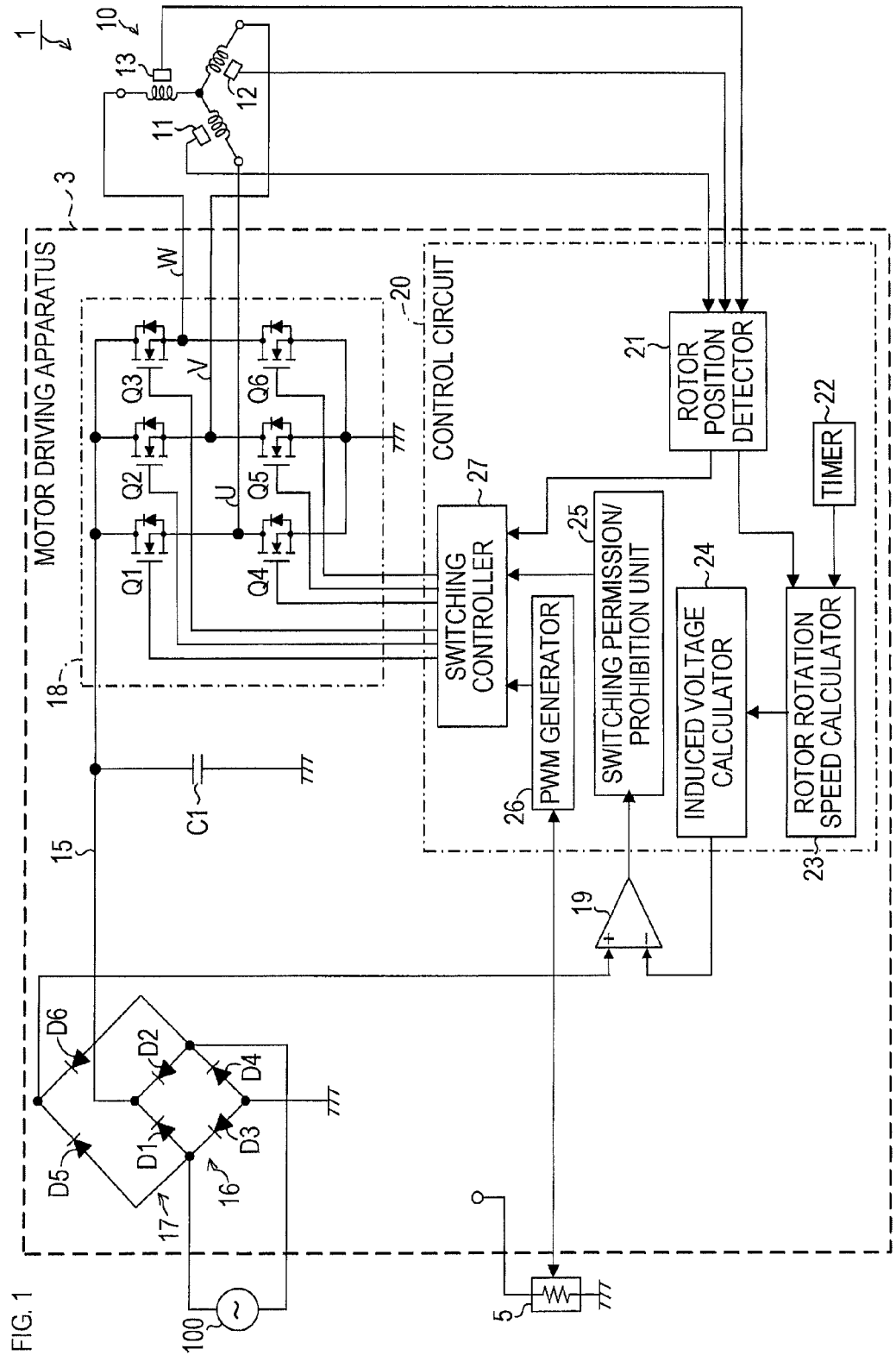
FIG. 1 is an explanatory view showing an electrical configuration of a motor-driven apparatus according to a first embodiment.

As shown in FIG. 1, a motor-driven apparatus (hereinafter simply referred to as the "apparatus") 1 of the present embodiment comprises a motor 10, a motor driving apparatus 3, and a trigger switch 5.

In the present embodiment, a description will be provided on condition that the apparatus 1 is configured as, for example, a driver drill that is an electric power tool. Specifically, the apparatus 1 of the present embodiment comprises a drill chuck and a gear mechanism, which are not shown in FIG. 1. The gear mechanism transmits a rotary driving force of the motor 10 to the drill chuck. The drill chuck is configured to have a front end portion to which a tool bit is detachably attachable. When the motor 10 rotates, the rotary driving force thereof is transmitted to the drill chuck through the gear mechanism, and thereby the drill chuck and the tool bit are rotated. "Rotation" of the motor 10 more specifically means rotation of a rotor of the motor 10.

The apparatus 1 of the present embodiment is configured to receive supply of an alternating-current power supply voltage (for example, an alternating-current 100 V) from a commercial power source 100 external to the apparatus 1 through a power supply cable, and to operate by the power supply voltage.

The motor 10 is a brushless motor comprising coils (windings) of three phases U, V, and W. The coils of the three phases are arranged in star connection as shown in FIG. 1 in the motor 10 of the present embodiment; however, this is only an example, and other types of connections (for example, delta connection) may be employed.

The motor 10 comprises three rotor position sensors 11, 12, and 13 to detect a rotational position of the motor 10. Each of the rotor position sensors 11, 12, and 13 is a Hall sensor in the present embodiment. The rotor position sensors 11, 12, and 13 are arranged at intervals of 120 electrical degrees around the rotor of the motor 10, and output Hall signals of the respective phases U, V, and W; an increasing direction and a decreasing direction of each of the Hall signals are reversed each time the rotor rotates by 180 electrical degrees.

The trigger switch 5 is a pull operation switch that is operated by a user of the apparatus 1 to drive or stop the motor 10. An operating state signal that indicates whether the trigger switch 5 is operated (i.e., in an ON state) or not operated (i.e., in an OFF state), and an operation amount signal that indicates an operation amount (a pulled amount) of the trigger switch 5 are outputted from the trigger switch 5, and are inputted to a control circuit 20 in the motor driving apparatus 3. Hereinafter, the operating state signal and the operation amount signal are also collectively referred to as an "operation signal".

The motor driving apparatus 3 drives or stops the motor 10 in accordance with the operation signal from the trigger switch 5. As shown in FIG. 1, the motor driving apparatus 3 of the present embodiment comprises a first full-wave rectifier circuit 16, a second full-wave rectifier circuit 17, an inverter circuit 18, a comparator 19, and the control circuit 20.

The first full-wave rectifier circuit 16 is a full-wave bridge rectifier circuit including four rectifying diodes D1, D2, D3, and D4. The alternating-current power supply voltage inputted from the commercial power source 100 is full-wave rectified by the first full-wave rectifier circuit 16, and the full-wave rectified voltage, which is referred to as a first full-wave rectified voltage, is inputted to the inverter circuit 18 through a feed line 15.

The second full-wave rectifier circuit 17 is a full-wave bridge rectifier circuit including four rectifying diodes D5, D6, D3, and D4. That is, among the four diodes D1, D2, D3, and D4 forming the first full-wave rectifier circuit 16, two diodes D3 and D4 having anodes thereof coupled to a ground line (ground potential) are used in common by the second full-wave rectifier circuit 17.

The alternating-current power supply voltage inputted from the commercial power source 100 is full-wave rectified by the first full-wave rectifier circuit 16, and is also full-wave rectified by the second full-wave rectifier circuit 17 in the same manner. A second full-wave rectified voltage, which is a voltage full-wave rectified by the second full-wave rectifier circuit 17, is inputted to a non-inverting input terminal of the comparator 19. Each of the full-wave rectifier circuits 16 and 17 is designed such that a full-wave rectified voltage of the same value is outputted from each of the full-wave rectifier circuits 16 and 17.

The inverter circuit 18 is a circuit to change states of current conduction to the respective phase coils of the motor 10 and to control conducting currents through the respective phase coils, to thereby rotationally drive the motor 10. The inverter circuit 18 comprises three switching elements Q1, Q2, and Q3 provided as high-side switches and three switching elements Q4, Q5, and Q6 provided as low-side switches.

Each of the three switching elements Q1, Q2, and Q3 as the high-side switches is provided between the feed line 15 and a corresponding one of the phase coils of the motor 10. Each of the three switching elements Q4, Q5, and Q6 as the low-side switches is provided between a corresponding one of the phase coils of the motor 10 and the ground line.

The six switching elements Q1 to Q6 included in the inverter circuit 18 are each an N-channel MOSFET in the present embodiment. Accordingly, between a drain and a source of each of the switching elements Q1 to Q6, a parasitic diode is parallely coupled in a forward direction from the source to the drain. Use of MOSFETs for the six switching elements Q1 to Q6 is merely an example, and switching elements of other types may also be employed.

A capacitor C1 is coupled between the feed line 15 and the ground line. The capacitor C1 is not a smoothing capacitor that smoothes a voltage of the feed line 15 (hereinafter referred to as a "bus voltage") to a constant voltage, but a so-called snubber capacitor to remove high-frequency noise from the bus voltage. Therefore, the capacitor C1 has an extremely small capacity compared with a smoothing capacitor and is small in size.

The comparator 19 compares the magnitudes of two analog signals that are inputted, and outputs a binary comparison signal indicating a comparison result to the control circuit 20. The second full-wave rectified voltage outputted from the second full-wave rectifier circuit 17 is inputted to the non-inverting input terminal of the comparator 19. An induced voltage D/A converted value (described in detail later) outputted from the control circuit 20 is inputted to an inverting input terminal of the comparator 19.

The comparator 19 compares a value of the second full-wave rectified voltage and the induced voltage D/A converted value. If the value of the second full-wave rectified voltage is smaller than the induced voltage D/A converted value, the comparator 19 outputs a comparison signal having a voltage value of a Low level (for example, a level that is approximately the same as a potential of the ground line). If the value of the second full-wave rectified voltage is equal to or larger than the induced voltage D/A converted value, the comparator 19 outputs a comparison signal having a voltage value of a High level which is larger than the voltage value of the Low level.

The control circuit 20 controls driving of the motor 10 by controlling turning on and off (that is, a switching operation) of the six switching elements Q1 to Q6 included in the inverter circuit 18. The control circuit 20 comprises: a rotor position detector 21, a timer 22 to measure time, a rotor rotation speed calculator 23, an induced voltage calculator 24, a switching permission/prohibition unit 25, a PWM generator 26, and a switching controller 27.

The control circuit 20 of the present embodiment comprises a microcomputer that includes a CPU, a ROM, and a RAM; the microcomputer mainly controls driving of the motor 10 in accordance with the operation signal from the trigger switch 5. The control circuit 20 may be achieved, in place of the microcomputer, by a combination of various separate electronic elements, by an Application Specified Integrated Circuit (ASIC), by a programmable logic device, such as a Field Programmable Gate Array (FPGA), or by a combination of these. When the control circuit 20 recognizes that the trigger switch 5 is operated by a user on the basis of the operating state signal, the control circuit 20 drives the motor 10 in accordance with the operation amount of the trigger switch 5 (directly in accordance with an operation amount signal). When the operation of the trigger switch 5 by the user is finished, the control circuit 20 brakes and stops the motor 10.

Various control programs to perform the above drive control of the motor 10 are stored in the ROM. Execution of the various control programs stored in the ROM by the CPU achieves functions of the rotor position detector 21, the timer 22, the rotor rotation speed calculator 23, the induced voltage calculator 24, the switching permission/prohibition unit 25, the PWM generator 26, and the switching controller 27, all of which are included in the control circuit 20.

In other words, the elements 21 to 27 in the control circuit 20 shown in FIG. 1 are illustrated as functional blocks representing respective functions that are achieved by execution of the various control programs in the ROM by the CPU included in the control circuit 20 according to the present embodiment. However, it is merely an example as described later that the elements 21 to 27 in the control circuit 20 are achieved by software processing.

The rotor position detector 21 detects the rotational position of the motor 10 (specifically, a rotational position of the rotor) on the basis of respective Hall signals from the three rotor position sensors 11, 12, and 13 provided to the motor 10. More specifically, the rotor position detector 21 performs waveform-shaping of the respective Hall signals of the three phases, U, V, and W from the respective rotor position sensors 11, 12, and 13, to thereby generate and output pulse-shaped rotor position signals, each of which is reversed in polarity between positive and negative at each specified rotation angle of the rotor. The generated rotor position signals of the respective phases are inputted to the rotor rotation speed calculator 23 and the switching controller 27.

The rotor rotation speed calculator 23 calculates a rotation speed of the rotor of the motor 10 (hereinafter also referred to as a "motor rotation number") on the basis of the rotor position signals inputted from the rotor position detector 21 and a measured time by the timer 22.

The induced voltage calculator 24 calculates a value of an induced voltage generated in the motor 10 on the basis of the motor rotation number calculated by the rotor rotation speed calculator 23. In the motor 10, respective induced voltages are generated in the coils of the respective phases in accordance with rotation. In the present specification, however, the induced voltage is intended to mean, unless otherwise specified, a combined voltage of the respective induced voltages generated in the coils of the respective phases, that is, an induced voltage applied from the motor 10 to the feed line 15 through the inverter circuit 18.

There may be various manners of calculating the value of the induced voltage on the basis of the motor rotation number by the induced voltage calculator 24. The value of the induced voltage is generally proportional to the motor rotation number. That is, changes in the motor rotation number may be recognized as changes in the induced voltage. Accordingly, it may be possible, for example, to previously set a proportional constant on the basis of various parameters of the motor 10, and to multiply the proportional constant by the motor rotation number, to thereby calculate the value of the induced voltage.

The value of the induced voltage calculated by the induced voltage calculator 24 is converted into an analog signal by a not-shown D/A converter, and a value of the analog-converted induced voltage is inputted to the inverting input terminal of the comparator 19 as the aforementioned induced voltage D/A converted value. The D/A converter may be provided in the control circuit 20 or external to the control circuit 20.

The PWM generator 26 calculates a drive duty ratio to perform PWM control of current conduction to the motor 10 on the basis of the operation signal from the trigger switch 5, and generates a PWM command indicating the drive duty ratio and outputs the PWM command to the switching controller 27. The PWM generator 26 generates the PWM command such that as the operation amount of the trigger switch 5 is larger, the drive duty ratio becomes larger (that is, as the operation amount of the trigger switch 5 is larger, the motor rotation number becomes larger).

The switching controller 27 performs a switching control to execute a switching operation of the inverter circuit 18 when the trigger switch 5 is operated. Specifically, the switching controller 27 obtains the rotational position of the motor 10 on the basis of the rotor position signals from the rotor position detector 21. Then, in accordance with the rotational position, the switching controller 27 generates drive signals to turn on one of the three switching elements Q1 to Q3 as high-side switches and one of the three switching elements Q4 to Q6 as low-side switches, these switches included in the inverter circuit 18, and then outputs the drive signals to the inverter circuit 18. Also, by using a PWM signal having a drive duty ratio that corresponds to the PWM command from the PWM generator 26 for the drive signal to either the high-side switch or the low-side switch to be turned on, the switch is duty driven.

By performing the switching control, a current corresponding to the drive duty ratio flows through the coils of the respective phases U, V, and W of the motor 10, and thereby the motor 10 rotates at a rotation speed corresponding to the operation amount of the trigger switch 5.

The switching permission/prohibition unit 25 permits or prohibits the switching control by the switching controller 27 on the basis of the comparison signal inputted from the comparator 19. In other words, the switching permission/prohibition unit 25 permits or prohibits an output of the drive signal (hereinafter also referred to as a "switching output") from the switching controller 27 to the inverter circuit 18.

Specifically, when a comparison signal of the High level is inputted from the comparator 19, that is, when the value of the second full-wave rectified voltage is equal to or larger than the induced voltage D/A converted value, the switching output is permitted to the switching controller 27. When a comparison signal of the Low level is inputted from the comparator 19, that is, when the value of the second full-wave rectified voltage is smaller than the induced voltage D/A converted value, the switching output by the switching controller 27 is prohibited.

Even when the trigger switch 5 is operated, the switching controller 27 stops the switching control and outputs no drive signal to the inverter circuit if the switching output is prohibited by the switching permission/prohibition unit 25. Accordingly, if the switching output is prohibited, the switching operation of the inverter circuit 18 is stopped (that is, all the six switching elements Q1 to Q6 are turned off), and the motor 10 is not rotationally driven. When the trigger switch 5 is operated, the switching controller 27 performs the switching control to output a drive signal to the inverter circuit 18 to thereby cause the motor 10 to rotate if the switching output is permitted by the switching permission/prohibition unit 25.

In the apparatus 1 of the present embodiment, the first full-wave rectified voltage that is full-wave rectified by the first full-wave rectifier circuit 16 is inputted to the inverter circuit 18 through the feed line 15. The capacitor C1, whose one end is coupled to the feed line 15, is provided not for the purpose of smoothing the first full-wave rectified voltage, as described above. Accordingly, the first full-wave rectified voltage outputted from the first full-wave rectifier circuit 16 is inputted to the inverter circuit 18 as a pulsating voltage (a pulsating flow) although an amount of pulsation of the voltage is slightly reduced by the capacitor C1.

While the motor 10 is rotating, the induced voltage generated in the motor 10 is applied to the feed line 15 through the inverter circuit 18. As a result, there is sometimes a time period when the first full-wave rectified voltage is smaller than the induced voltage, while the switching control by the control circuit 20 is performed and the motor 10 is rotationally driven. In the time period, the first full-wave rectified voltage is not applied to the motor 10 even if the inverter circuit 18 performs the switching operation, since the induced voltage is larger than the first full-wave rectified voltage. In other words, since the motor 10 does not rotate by the first full-wave rectified voltage in the time period, performing the switching operation will not contribute to the control of the motor 10.

In the apparatus 1 of the present embodiment, therefore, the switching output from the control circuit 20 is prohibited in the time period when the first full-wave rectified voltage is smaller than the induced voltage, to thereby forcibly stop the switching operation of the inverter circuit 18.

In order to determine the time period when the first full-wave rectified voltage is smaller than the induced voltage, that is, a time period when the switching output should be prohibited (hereinafter also referred to as a "switching prohibition period"), it is necessary to obtain a value of the first full-wave rectified voltage outputted (i.e., applied) from the first full-wave rectifier circuit 16 to the feed line 15 and a value of the induced voltage applied from the motor 10 to the feed line 15. It is not always necessary to directly obtain the value itself of the first full-wave rectified voltage; it is sufficient to obtain, as full-wave rectified voltage information, at least one type of information that directly or indirectly indicates the value of the first full-wave rectified voltage. Also, as for the induced voltage, it is not always necessary to directly obtain the value of the induced voltage applied to the feed line 15; it is sufficient to obtain, as induced voltage information, at least one type of information that directly or indirectly indicates the value of the induced voltage.

Once the full-wave rectified voltage information and the induced voltage information are obtained, it is possible to determine the switching prohibition period (that is, the period when the first full-wave rectified voltage is smaller than the induced voltage) on the basis of such information.

In the present specification, Method A1 and Method A2 below are proposed as specific methods for obtaining the full-wave rectified voltage information.

Method A1: A method in which the second full-wave rectifier circuit 17, which is provided separately from the first full-wave rectifier circuit 16 to generate the first full-wave rectified voltage for driving the motor, is used, and the value of the second full-wave rectified voltage that is full-wave rectified by the second full-wave rectifier circuit 17 is obtained as the full-wave rectified voltage information.

Method A2: A method in which a zero-cross point and a maximum value (a peak value) of the alternating-current power supply voltage supplied from the commercial power source 100 are obtained as the full-wave rectified voltage information.

The value of the second full-wave rectified voltage obtained by above Method A1 is substantially equal to the value of the first full-wave rectified voltage. Therefore, Method A1 can be referred to as a method for directly obtaining the value of the first full-wave rectified voltage.

The zero-cross point and the maximum value of the power supply voltage obtained by above Method 2 are information indirectly indicating the value of the first full-wave rectified voltage. In Method A2, it may be possible to obtain the zero-cross point and the maximum value of the power supply voltage, to calculate, by estimation, the value of the first full-wave rectified voltage on the basis of the obtained zero-cross point and the maximum value, to thereby obtain an estimated value as the full-wave rectified voltage information.

In the present specification, Method B1 and Method B2 below are also proposed as specific methods for obtaining the induced voltage information.

Method B1: A method in which a rotation number of the motor 10 is calculated, and then the rotation number, as it is, is obtained as the induced voltage information; or the value of the induced voltage is calculated by estimation on the basis of the rotation number to thereby obtain the estimated value as the induced voltage information.

Method B2: A method in which, if the switching output is temporarily prohibited while the switching control is performed, a combined value of phase voltages that is obtained by parallelly combining the voltages of the respective phase coils of the motor 10 (induced voltages of the respective phases) is obtained as the induced voltage information.

The value of the induced voltage of the motor 10 is substantially proportional to the rotation number of the motor 10. Accordingly, to obtain the rotation number of the motor 10 in Method B1 means to indirectly obtain the value of the induced voltage.

There may be various methods to calculate, by estimation, the value of the induced voltage on the basis of the rotation number of the motor 10. For example, it may be possible to previously set a constant corresponding to various parameters of the motor 10, and multiply the rotation number by the constant to thereby calculate the value of the induced voltage by estimation.

If the switching output is prohibited while the switching control is performed, power supply from the inverter 18 to the motor 10 is temporarily stopped, and no voltage is supplied from the inverter 18 to the respective phase coils of the motor 10. As a result, the combined value of the phase voltages during the switching prohibition period in Method B2 is a value that directly indicates the value of the induced voltage generated in the motor 10.

Further, in the present specification, Method C1, Method C2, and Method C3 below are proposed as specific methods for determining the switching prohibition period (the period when the first full-wave rectified voltage is smaller than the induced voltage).

Method C1: A method in which an analog value of the first full-wave rectified voltage represented by the full-wave rectified voltage information that is obtained by above Method A1 or Method A2 and an analog value of the induced voltage represented by the induced voltage information that is obtained by above Method B1 or Method B2 are compared in magnitude using a comparator circuit for comparing analog signals.

Method C2: A method in which a digital value of the first full-wave rectified voltage represented by the full-wave rectified voltage information that is obtained by above Method A1 or Method A2 and a digital value of the induced voltage represented by the induced voltage information that is obtained by above Method B1 or Method B2 are compared in magnitude through software processing by the microcomputer.

Method C3: A method in which the full-wave rectified voltage information obtained by Method A1 or Method A2 and the induced voltage information obtained by Method B1 or Method B2 are collectively considered as obtained voltage information, and a conversion table to associate the obtained voltage information with the switching prohibition period is prepared in advance; and the switching prohibition period is determined using the conversion table.

It is possible to optionally select which of Method A1 and Method A2 as the specific method to obtain the full-wave rectified voltage information, which of Method B1 and Method B2 as the specific method to obtain the induced voltage information, and which of Method C1, Method C2, and Method C3 as the specific method to determine the switching prohibition period, and any combination thereof is possible.

In the present specification, the following three patterns of possible combinations will be specifically described. A first pattern is a combination of Methods A1, B1, and C1. The first pattern has an advantage as compared with the other patterns in that the switching prohibition period can be accurately determined while reducing a processing load of the microcomputer. The first pattern will be described in the present first embodiment.

A second pattern is a combination of Methods A1, B2, and C2. The second pattern has an advantage as compared with the other patterns in that the induced voltage can be detected accurately, and thus the switching prohibition period can be accurately determined. The second pattern will be described in an after-mentioned second embodiment.

A third pattern is a combination of Methods A2, B1, and C3. The third pattern has an advantage as compared with the second pattern in that the processing load of the microcomputer is small. The third pattern will be described in an after-mentioned third embodiment.

The apparatus 1 of the first embodiment is configured such that the switching prohibition period can be determined by the first pattern. The full-wave rectified voltage information is obtained by Method A1. Specifically, the second full-wave rectifier circuit 17 is provided, and the second full-wave rectified voltage outputted from the second full-wave rectifier circuit 17 is used as the full-wave rectified voltage information.

Since the first full-wave rectified voltage is outputted to the feed line 15, and inputted to the inverter circuit 18 through the feed line 15, the value of the first full-wave rectified voltage may be directly detected by monitoring the voltage of the feed line 15. In this case, although the voltage of the feed line 15 is subject to application of the induced voltage of the motor 10, and also might be affected by a charging capacity of the capacitor C1, the value of the first full-wave rectified voltage may be detected on the basis of the value of the voltage of the feed line 15.

In contrast, the second full-wave rectified voltage is not affected by the induced voltage of the motor 10 or the charging capacity of the capacitor C1; also, the value of the second full-wave rectified voltage is substantially the same as the value of the first full-wave rectified voltage. Accordingly, the value of the second full-wave rectified voltage can be used as a value that directly indicates the value of the first full-wave rectified voltage. In the first embodiment, the second full-wave rectified voltage is inputted to the non-inverting input terminal of the comparator 19.

Also, in the first embodiment, the induced voltage information is obtained by Method B 1. Specifically, through software processing by the control circuit 20 (more specifically, by the induced voltage calculator 24), the value of the induced voltage is calculated on the basis of the motor rotation number, the calculated value is D-A converted, and the converted value is inputted to the inverting input terminal of the comparator 19.

Then, the switching permission/prohibition unit 25 in the control circuit 20 prohibits the switching output during the switching prohibition period, while the comparison signal is at the Low level, on the basis of the comparison signal from the comparator 19.

A description will now be given of a switching determination process that is executed by the control circuit 20 in order to permit or prohibit the switching output in the apparatus 1 of the first embodiment with reference to FIG. 2. When a power supply voltage is supplied to the apparatus 1 from the external commercial power source 100, power for operation is supplied to the control circuit 20, and various elements in the control circuit 20 (including the CPU) are activated. When activated, the CPU in the control circuit 20 reads from the ROM a program for the switching determination process shown in FIG. 2, and executes the program repeatedly in a specified control cycle.

Figure 2:
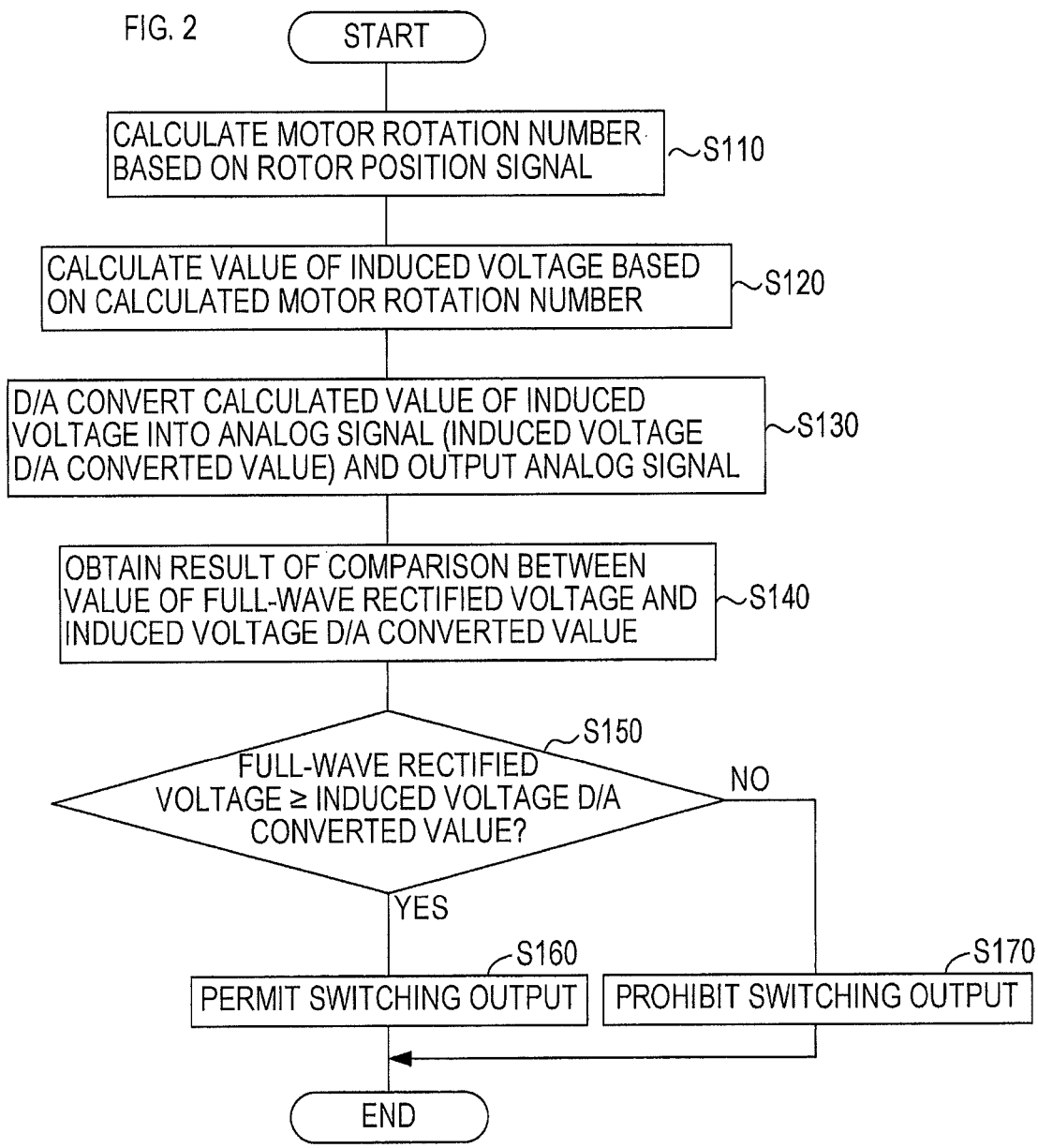
FIG. 2 is a flowchart of a switching determination process in the first embodiment.

When starting the switching determination process in FIG. 2, the CPU in the control circuit 20 generates a rotor position signal in S110 on the basis of Hall signals from the rotor position sensors 11, 12, and 13, and calculates a motor rotation number on the basis of the rotor position signal. This process in S110 serves a function as the rotor rotation speed calculator 23.

In S120, the value of the induced voltage is calculated on the basis of the motor rotation number calculated in S110, for example, by the above-described proportional calculation. This process in S120 serves a function as the induced voltage calculator 24.

In S130, the value of the induced voltage calculated in S120 is converted into an analog signal (D/A converted value) by a not-shown D/A converter, and is outputted. The induced voltage D/A converted value is inputted to the comparator 19.

In S140, on the basis of the comparison signal outputted from the comparator 19, a result of comparison by the comparator 19 that is a magnitude comparison result between the value of the full-wave rectified voltage and the induced voltage D/A converted value is obtained. In S150, it is determined whether the value of the full-wave rectified voltage is equal to or larger than the induced voltage D/A converted value on the basis of the magnitude comparison result obtained in S140.

If the value of the full-wave rectified voltage is equal to or larger than the induced voltage D/A converted value, the switching output by the switching controller 27 is permitted in S160. As a result, the switching controller 27 performs the switching control. If the value of the full-wave rectified voltage is smaller than the induced voltage D/A converted value, the switching output by the switching controller 27 is prohibited in S170 on the basis of a determination that it is in a switching prohibition period. As a result, the switching controller 27 temporarily stops the switching control. The processes from S140 to S170 serve a function as the switching permission/prohibition unit 25.

According to the apparatus 1 of the first embodiment as described above, even when the trigger switch 5 is operated, switching operation of the inverter circuit 18 is forcibly stopped if the first full-wave rectified voltage is smaller than the induced voltage.

The full-wave rectified voltage information representing the value of the first full-wave rectified voltage that is required to determine whether the first full-wave rectified voltage is smaller than the induced voltage is obtained from the second full-wave rectifier circuit 17. Specifically, the value of the second full-wave rectified voltage outputted from the second full-wave rectifier circuit 17 is compared with the value of the induced voltage. The second full-wave rectified voltage has substantially the same value as the value of the first full-wave rectified voltage, and is not affected by the induced voltage generated from the motor 10.

It is, therefore, possible to appropriately detect a period during which power is not supplied to the motor 10 even if the switching operation is performed, that is, a period when the first full-wave rectified voltage is smaller than the induced voltage (a switching output prohibition period), and to stop the switching operation during the switching output prohibition period. Thus, efficient driving of the motor 10 while reducing unnecessary power consumption can be achieved.

Also, the value of the induced voltage is calculated by software processing on the basis of the motor rotation number. The motor rotation number is calculated on the basis of the Hall signals from the three rotor position sensors 11, 12, and 13 provided to the motor 10; the three rotor position sensors 11, 12, and 13 are provided not for calculation of the value of the induced voltage, but for usual use for the drive control of the brushless motor. In other words, the value of the induced voltage is calculated by software processing by means of the three rotor position sensors 11, 12, and 13 that are usually used for the control of the brushless motor. Thus, the value of the induced voltage can be obtained at a low cost.

The comparison between the full-wave rectified voltage and the induced voltage is made by hardware processing by the comparator 19, that is, a comparison of the analog signals. It is, therefore, possible to detect a switching output prohibition period rapidly and highly accurately. Voltage divider circuits may be provided before each input terminal of the comparator 19. Specifically, it may be such that the second full-wave rectified voltage from the second full-wave rectifier circuit 17 is divided by a voltage divider circuit and inputted to the non-inverting input terminal of the comparator 19, whereas the induced voltage D/A converted value from the control circuit 20 is divided in the same manner by a voltage divider circuit and is inputted to the inverting input terminal of the comparator 19.

Second Embodiment

Next, a description will be given of an apparatus 40 of a second embodiment with reference to FIG. 3. In the apparatus 40 of the second embodiment shown in FIG. 3, the same elements as those in the apparatus 1 of the first embodiment shown in FIG. 1 will be assigned the same reference numerals, and will not be described further. Hereinafter, the apparatus 40 of the second embodiment will be described focusing on configurations that are different from those in the apparatus 1 of the first embodiment.

Figure 3:
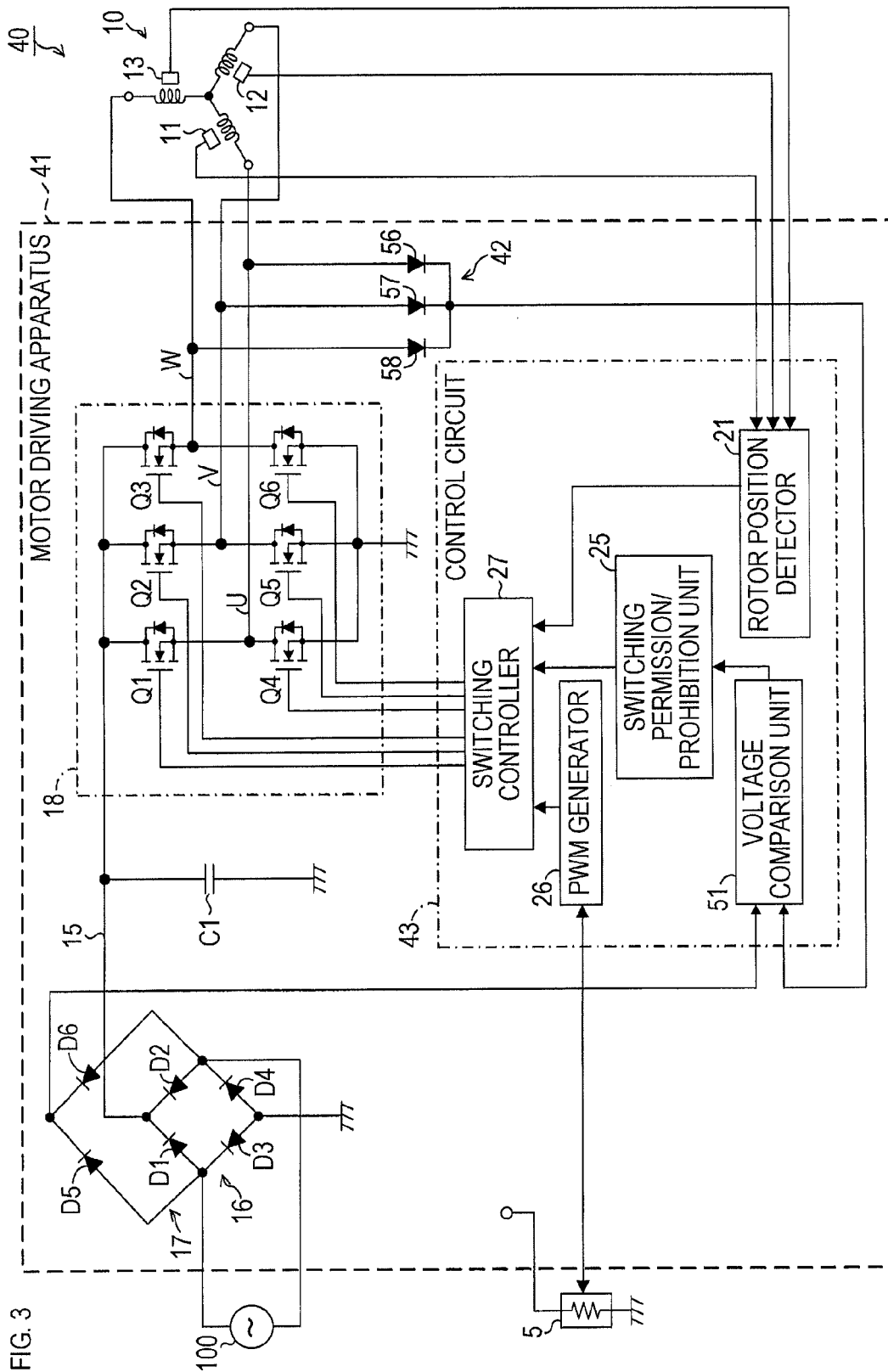
FIG. 3 is an explanatory view showing an electrical configuration of a motor-driven apparatus according to a second embodiment.

As shown in FIG. 3, the apparatus 40 of the second embodiment comprises a phase voltage combining circuit 42 that parallelly combines voltages in respective conduction paths for the respective phases from the inverter circuit 18 to the motor 10 in a motor controller 41, and outputs the parallely combined voltage.

The phase voltage combining circuit 42 comprises three diodes, which are a U-phase diode 56, a V-phase diode 57, and a W-phase diode 58. Specifically, an anode of the U-phase diode 56 is coupled to a U-phase conduction path, an anode of the V-phase diode 57 is coupled to a V-phase conduction path, and an anode of the W-phase diode 58 is coupled to a W-phase conduction path. Respective cathodes of the three diodes 56, 57, and 58 are coupled to one another; respective voltages of these cathodes are outputted as a combined voltage and inputted to the control circuit 43.

The control circuit 43 is different from the control circuit 20 of the first embodiment in that any of the timer 22, the rotor rotation speed calculator 23, and the induced voltage calculator 24 is not provided and in that a voltage comparison unit 51 is provided.

The combined voltage is inputted from the phase voltage combining circuit 42 to the control circuit 43, and the value of the combined voltage is converted into digital data (an A/D converted value) by a not-shown A/D converter, and the digital data is inputted to the voltage comparison unit 51.

The second full-wave rectified voltage outputted from the second full-wave rectifier circuit 17, which is inputted to the comparator 19 in the first embodiment, is inputted to the control circuit 43 in the second embodiment. Then, the value of the inputted second full-wave rectified voltage is converted into digital data by a not-shown A/D converter, and the digital data (an A/D converted value) is inputted to the voltage comparison unit 51.

The voltage comparison unit 51 compares the magnitudes of the A/D converted value of the full-wave rectified voltage and the A/D converted value of the combined voltage, and outputs the comparison result to the switching permission/prohibition unit 25. However, in the second embodiment as described later, A/D conversion of the value of the combined voltage, and comparison of the magnitudes of the digital data after the A/D conversion of the value of the combined voltage and the full-wave rectified voltage A/D converted value are performed during a period when the switching output is prohibited by the switching permission/prohibition unit 25. The value of the combined voltage outputted from the phase voltage combining circuit 42 during a period when the switching output is prohibited is a value that directly indicates the induced voltage generated from the motor 10 as described above. Therefore, the value of the combined voltage after the A/D conversion, which is performed during the period when the switching output is prohibited, is hereinafter also referred to as an "induced voltage A/D converted value." The above described function of the voltage comparison unit 51 is achieved by software processing by the microcomputer in the second embodiment.

The switching permission/prohibition unit 25 permits or prohibits the switching output from the switching controller 27 on the basis of results of the comparison by the voltage comparison unit 51.

The apparatus 40 of the second embodiment is configured to be able to determine a switching prohibition period by the second pattern (the combination of Methods A1, B2, and C2). Specifically, the full-wave rectified voltage information is obtained by Method A1 in the same manner as in the first embodiment. More specifically, the second full-wave rectified voltage outputted from the second full-wave rectifier circuit 17 is inputted to the control circuit 43 as the full-wave rectified voltage information, and is A/D converted to the full-wave rectified voltage A/D converted value, which is inputted to the voltage comparison unit 51. The induced voltage information is obtained by Method B2. Specifically, the value of the combined voltage inputted from the phase voltage combining circuit 42 during the period when the switching output is prohibited is A/D converted, and the A/D converted digital data, i.e., the induced voltage A/D converted value, is inputted to the voltage comparison unit 51.

Then, as described above, the voltage comparison unit 51 compares the magnitudes of the full-wave rectified voltage A/D converted value and the digital data of the value of the combined voltage, and outputs the comparison result to the switching permission/prohibition unit 25.

Figure 4:
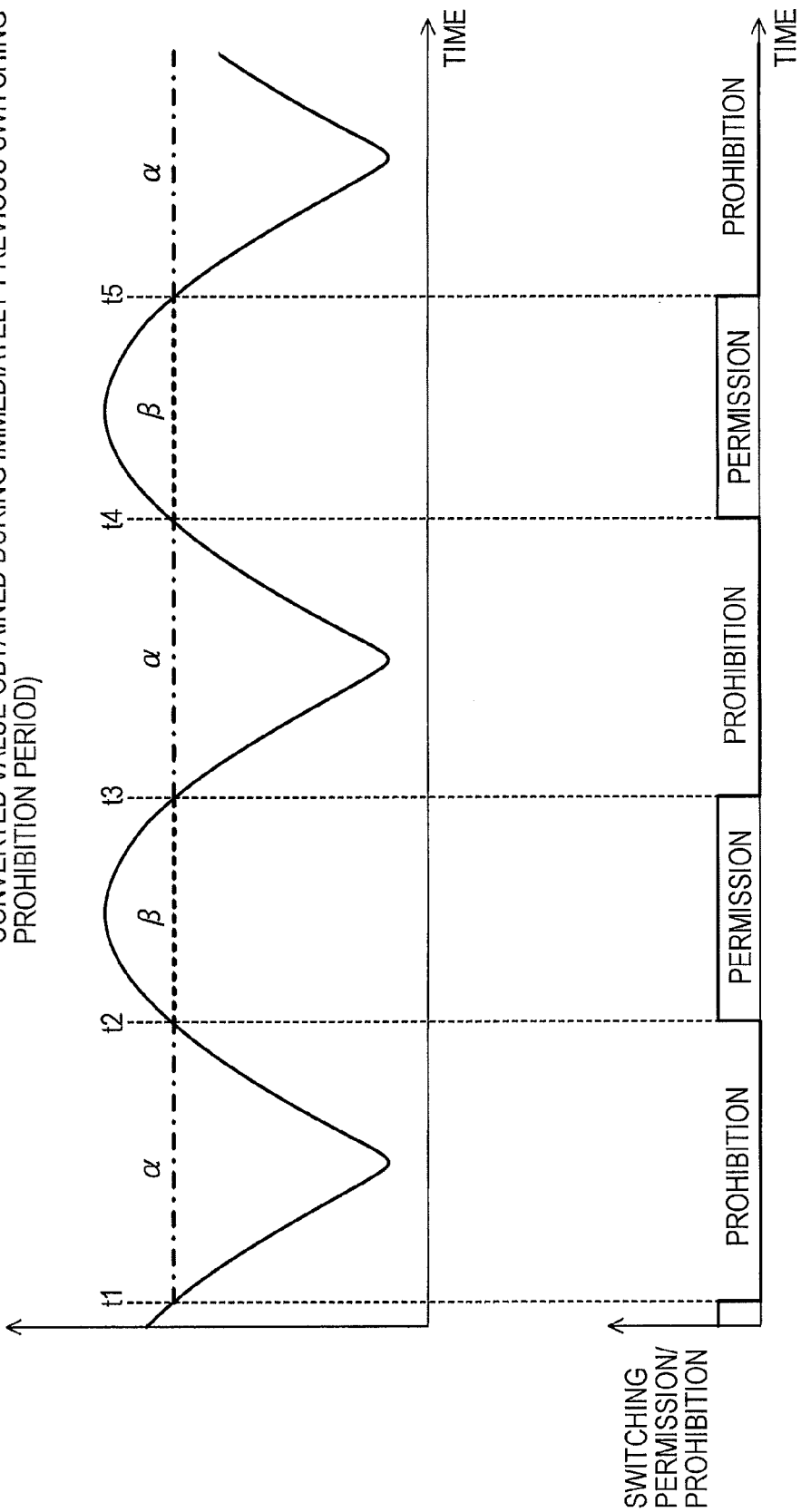
FIG. 4 is an explanatory view illustrating how to determine a permission/prohibition timing of switching output in the second embodiment.

In the second embodiment, therefore, obtainment of the induced voltage (specifically, obtainment of the induced voltage A/D converted value) and permission/prohibition of the switching output on the basis of the induced voltage A/D converted value are performed as detailed below. As exemplarily shown in FIG. 4, while the switching controller 27 is performing the switching control after the trigger switch 5 is operated, if the full-wave rectified voltage A/D converted value becomes smaller than the induced voltage A/D converted value (a time t1), the switching output is prohibited. The value of the induced voltage to be used while the switching output is permitted before the time t1 is a value (an estimated induced voltage value) obtained during an immediately previous period while the switching output is prohibited.

When the switching output is stopped at the time t1, a process to obtain the induced voltage A/D converted value and the full-wave rectified voltage A/D converted value and to compare the magnitudes of these values is executed periodically. When the full-wave rectified voltage A/D converted value becomes equal to or more than the induced voltage A/D converted value (a time t2), the switching output is permitted, and the switching operation is resumed. Once the switching output is permitted at the time t2, obtainment of the induced voltage A/D converted value is no longer performed; the voltage comparison unit 51 compares the magnitudes of the estimated induced voltage value and the full-wave rectified voltage A/D converted value using the latest induced voltage A/D converted value obtained during the immediately previous switching output prohibition period (that is, the induced voltage A/D converted value obtained at the time t2) as the estimated induced voltage value during the switching output permission period.

When the full-wave rectified voltage A/D converted value becomes smaller than the estimated induced voltage value at a time t3, the switching output is prohibited again. When the switching output is stopped at the time t3, a process to obtain the induced voltage A/D converted value and the full-wave rectified voltage A/D converted value and to compare the magnitudes of these values is executed periodically in the same manner as at or after the time t1. When the full-wave rectified voltage A/D converted value becomes equal to or more than the induced voltage A/D converted value (a time t4), the switching output is permitted again, and the switching operation is resumed. Once the switching output is permitted at the time t4, obtainment of the induced voltage A/D converted value is no longer performed; the voltage comparison unit 51 compares the magnitudes of the estimated induced voltage value and the full-wave rectified voltage A/D converted value using the latest induced voltage A/D converted value obtained in the immediately previous switching output prohibition period (that is, the induced voltage A/D converted value obtained at the time t4) as the estimated induced voltage value during the switching output permission period. The same process continues to be executed until the operation of the trigger switch 5 is terminated.

A description will now be given of a switching determination process executed by the CPU of the control circuit 43 to permit or prohibit the switching output in the apparatus 40 of the second embodiment with reference to FIG. 5.

Figure 5:
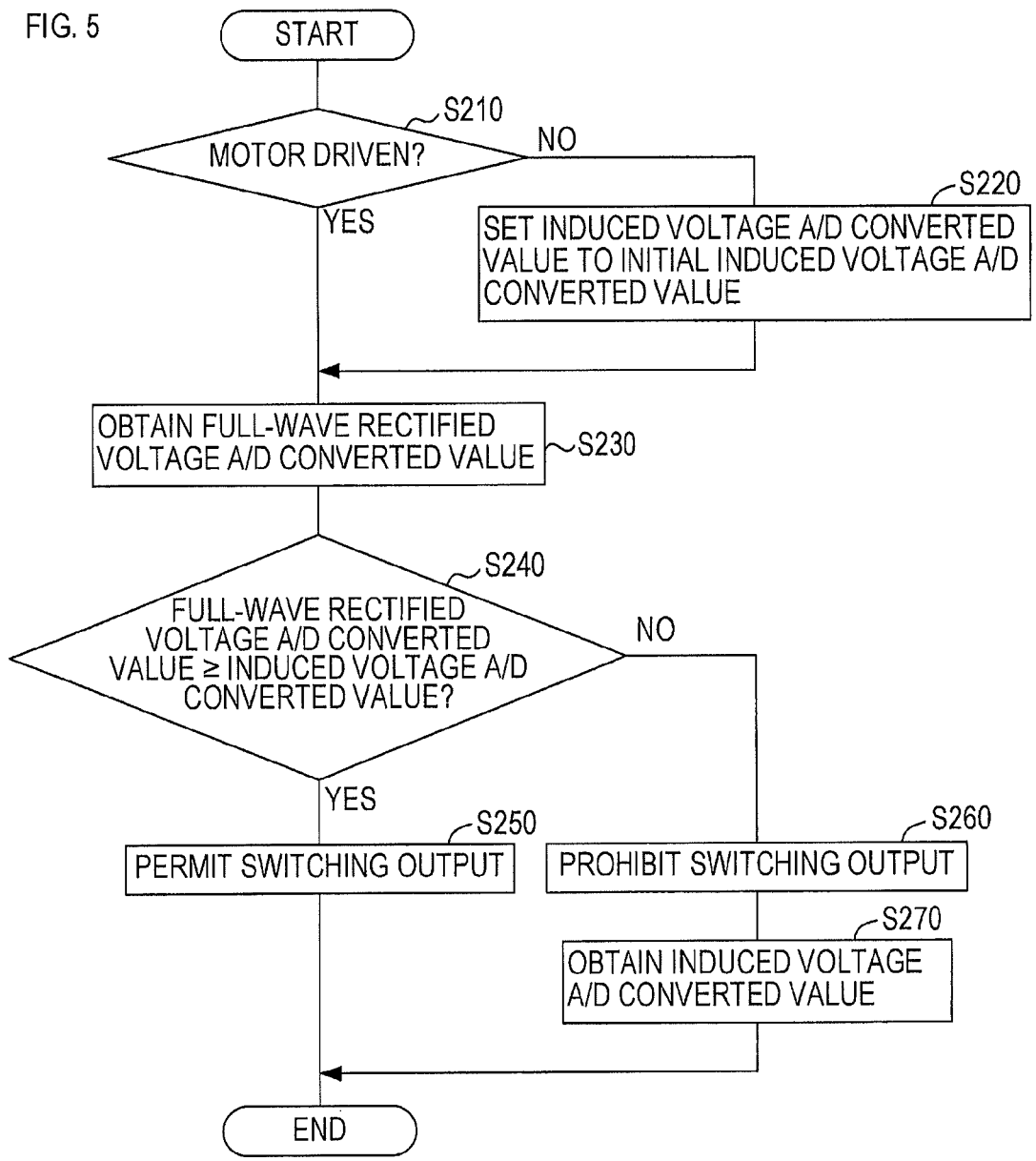
FIG. 5 is a flowchart of a switching determination process in the second embodiment.

When starting the switching determination process in FIG. 5, the CPU of the control circuit 43 determines in S210 whether the motor 10 is being driven, that is, whether the trigger switch 5 is operated (in a state where the switching control should be performed). If the motor 10 is being driven, that is, the trigger switch 5 is operated, the present process proceeds to S230. If the motor 10 is not driven, that is, the trigger switch 5 is off, the present process proceeds to S220.

In S220, the induced voltage A/D converted value is updated and set to a previously specified initial induced voltage A/D converted value. While the trigger switch 5 is off and the motor 10 is stopped, no induced voltage is generated from the motor 10. In this period, therefore, the induced voltage A/D converted value is conveniently updated and set to the specified initial induced voltage A/D converted value.

A specific value of the initial induced voltage A/D converted value may be appropriately determined; for example, the specific value may be an induced voltage A/D converted value corresponding to a minimum rotation number that is the smallest of target rotation numbers to be set in accordance with the operation amount of the trigger switch 5 (that is, the A/D converted value of the induced voltage generated during rotation at the minimum rotation number).

In S230, the full-wave rectified voltage A/D converted value is obtained. In S240, it is determined whether the full-wave rectified voltage A/D converted value obtained in S230 is equal to or more than the currently set induced voltage A/D converted value. If the full-wave rectified voltage A/D converted value is equal to or more than the induced voltage A/D converted value, the switching output by the switching controller 27 is permitted in S250. Then, the switching controller 27 performs the switching control.

If the full-wave rectified voltage A/D converted value is smaller than the induced voltage A/D converted value, it is determined in S260 that it is the switching prohibition period, and the switching output by the switching controller 27 is prohibited. Then, the switching controller 27 temporarily stops the switching control.

Subsequently in S270, the current induced voltage A/D converted value is obtained. Specifically, the value of the combined voltage is A/D converted, and the latest induced voltage A/D converted value after the A/D conversion is obtained. Each time the process in S270 is performed, the induced voltage A/D converted value is updated and set to the obtained value. Accordingly, when the determination process in S240 is executed again after the process in S270, the induced voltage A/D converted value obtained in the immediately previous process in S270 is to be used. The function of the voltage comparison unit 51 is achieved by the processes in S220, S230, S240, and S270.

According to the apparatus 40 of the second embodiment described above, it is possible to directly detect the value of the induced voltage generated from the motor 10 by the phase voltage combining circuit 42; that is, it is possible to detect the value of the induced voltage highly accurately. Thus, the switching output prohibition period can be detected highly accurately on the basis of the highly accurate detection of the value of the induced voltage.

Also, it is configured such that the value of the second full-wave rectified voltage outputted from the second full-wave rectifier circuit 17 and the value of the combined voltage outputted from the phase voltage combining circuit 42 are each A/D converted, and the respective A/D converted values are compared in magnitude by software processing. Accordingly, as compared with the magnitude comparison method using the comparator 19 as in the first embodiment, hardware can be reduced, which enables downsizing of the apparatus and cost reduction.

Third Embodiment

Next, a description will be given of an apparatus 70 of a third embodiment with reference to FIG. 6. In the apparatus 70 of the third embodiment shown in FIG. 6, the same elements as those in the apparatus 1 of the first embodiment shown in FIG. 1 are assigned the same reference numerals as in FIG. 1, and no further description thereof will be given. The following description of the apparatus 70 of the third embodiment will be focused on configurations that are different from those in the apparatus 1 of the first embodiment.

Figure 6:
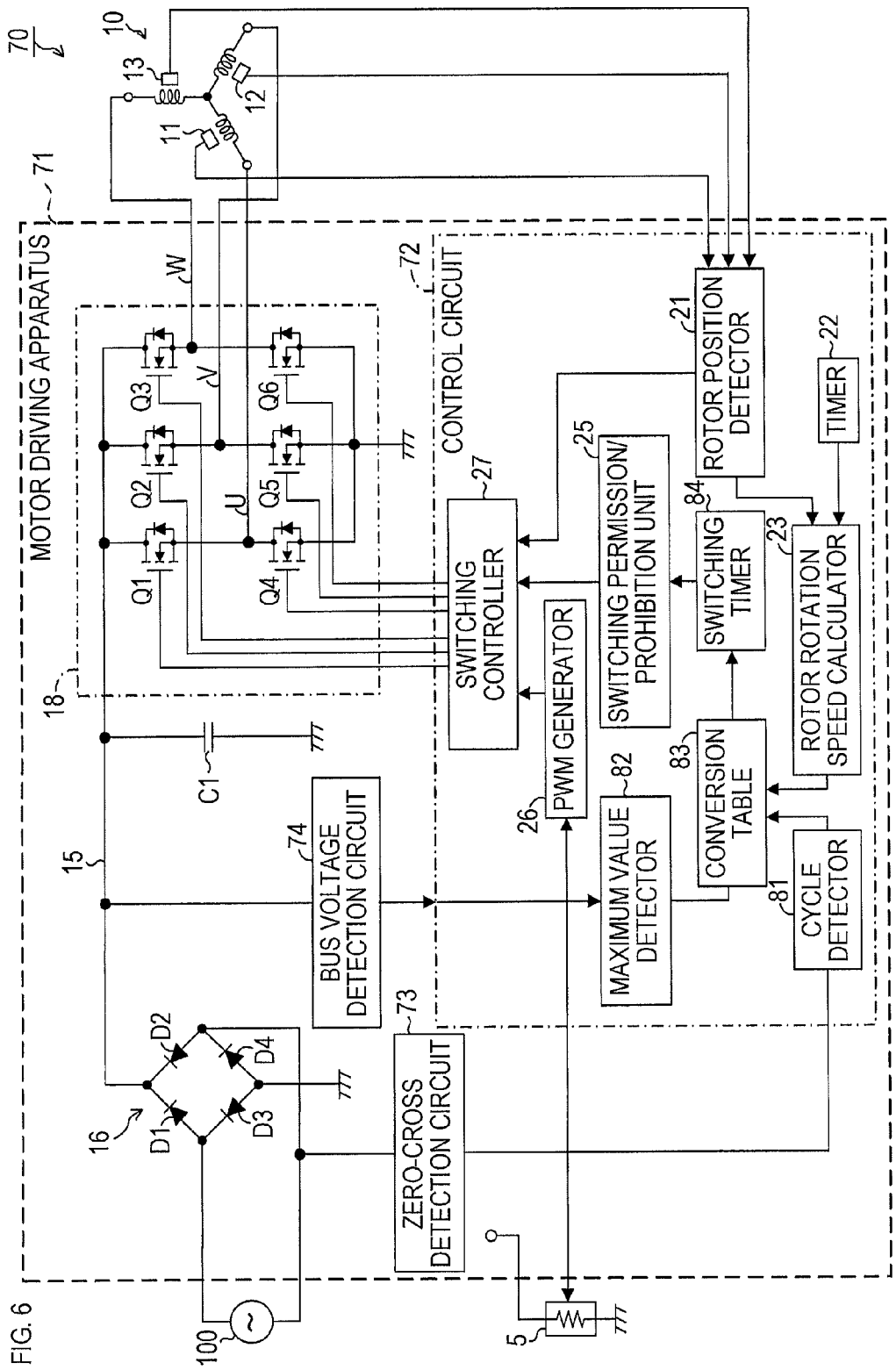
FIG. 6 is an explanatory view showing an electrical configuration of a motor-driven apparatus according to a third embodiment.

As shown in FIG. 6, the apparatus 70 of the third embodiment does not comprise the second full-wave rectifier circuit 17 (see FIG. 1) to obtain the full-wave rectified voltage information. In the third embodiment, a zero-cross detection circuit 73 and a bus voltage detection circuit 74 are provided to obtain the full-wave rectified voltage information.

The zero-cross detection circuit 73 detects a zero-cross point (a timing at which the value of the power supply voltage is zero) of the alternating-current power supply voltage supplied from the commercial power source 100, and outputs the detection result to a control circuit 72. The bus voltage detection circuit 74 detects a value of a voltage (a bus voltage) of the feed line 15, and outputs the detection result to the control circuit 72.

The control circuit 72 is different from the control circuit 20 of the first embodiment in that the control circuit 72 comprises a cycle detector 81, a maximum value detector 82, a conversion table 83, and a switching timer 84. In the present embodiment, the cycle detector 81, the maximum value detector 82, and the switching timer 84 are achieved by software processing by the microcomputer. The conversion table 83 is stored in the ROM or another storage medium.

The cycle detector 81 detects intervals of zero-cross points, that is, a cycle of the power supply voltage on the basis of the detection result inputted from the zero-cross detection circuit 73. The maximum value detector 82 detects a maximum value of the bus voltage on the basis of the detection result inputted from the bus voltage detection circuit 74.

In the present embodiment, however, the detection of the maximum value of the bus voltage by the maximum value detector 82 is performed when the trigger switch 5 is off. When the trigger switch 5 is off, no induced voltage is generated from the motor 10, and the bus voltage is retained at the maximum value of the power supply voltage by the capacitor C1; accordingly, the bus voltage may be considered as a voltage that directly indicates a maximum value of the first full-wave rectified voltage from the first full-wave rectifier circuit 16, and thus may be considered to directly indicate the maximum value of the power supply voltage. That is, detecting the bus voltage when the trigger switch 5 is off is equivalent to detecting the maximum value of the power supply voltage.

The conversion table 83, as is exemplarily shown in FIG. 7, includes a plurality of tables, in each of which the motor rotation number is associated with a permission switching time T1 and a prohibition switching time T2, prepared separately for respective possible combinations of a power supply cycle and the maximum value of the power supply voltage.

The apparatus 70 of the third embodiment accepts, for example, at least AC100 V and AC220 V as the power supply voltage, and at least 1/50 seconds (i.e., 50 Hz) and 1/60 seconds (i.e., 60 Hz) as the power supply cycle. Therefore, a plurality of types of tables for respective possible power supply voltages are previously prepared, including a table to be used when a power supply voltage having an effective value of 100 V and a power supply cycle of 1/50 seconds is supplied, a table to be used when a power supply voltage having an effective value of 100 V and a power supply cycle of 1/60 seconds is supplied, a table to be used when a power supply voltage having an effective value of 220 V and a power supply cycle of 1/50 seconds is supplied.

In each of the tables included in the conversion table 83, the permission switching time T1 and the prohibition switching time T2 each indicate an elapsed time since the zero-cross point. More specifically, the permission switching time T1 is a time to determine a timing to permit the switching output using the zero-cross point as a starting point. In other words, when the permission switching time T1 has elapsed since the zero-cross point, the switching output is permitted. The permission switching time T1 is set to a time estimated to be required for the full-wave rectified voltage to gradually increase from the zero-cross point as a starting point to reach an induced voltage level.

The prohibition switching time T2 is a time to determine a timing to prohibit the switching output using the zero-cross point as a starting point, and is longer than the permission switching time T1. Specifically, when time further elapses after the permission switching time T1 has elapsed since the zero-cross point and the switching output is permitted, and the elapsed time from the zero-cross point has reached the prohibition switching time T2, the switching output is prohibited. The prohibition switching time T2 is set to a time that is estimated to be required for the full-wave rectified voltage to once reach a peak and then decrease to reach the induced voltage level again, from the zero-cross point as a starting point.

When the power supply cycle and the maximum value of the power supply voltage are given, the full-wave rectified voltage can be estimated. Also, when the motor rotation number is given, the induced voltage can be estimated. When the full-wave rectified voltage and the induced voltage can be estimated, it is possible to estimate the time (the permission switching time T1) for the full-wave rectified voltage to reach the induced voltage level from a level below the induced voltage since the zero-cross point as a starting point, and the time (the prohibition switching time T2) for the full-wave rectified voltage to reach a peak and then decrease to the induced voltage level again.

Accordingly, in the present embodiment, the permission switching time T1 and the prohibition switching time T2 for each combination of the power supply cycle, the maximum value of the power supply voltage, and the motor rotation number are previously estimated by calculation, and the estimated values are stored as the conversion table 83. On the basis of a corresponding table in the conversion table 83, each time a zero-cross point is detected, permission of the switching output when the permission switching time T1 has elapsed and prohibition of the switching output when the prohibition switching time T2 has elapsed, using the zero-cross point as a starting point, are performed. Time measurement from the zero-cross point as a starting point is performed by the switching timer 84, and information of the time measurement is inputted to the switching permission/prohibition unit 25. Each time a zero-cross point is detected, the measured time by the switching timer 84 is reset, and time measurement is started from a reset state.

Figure 8:
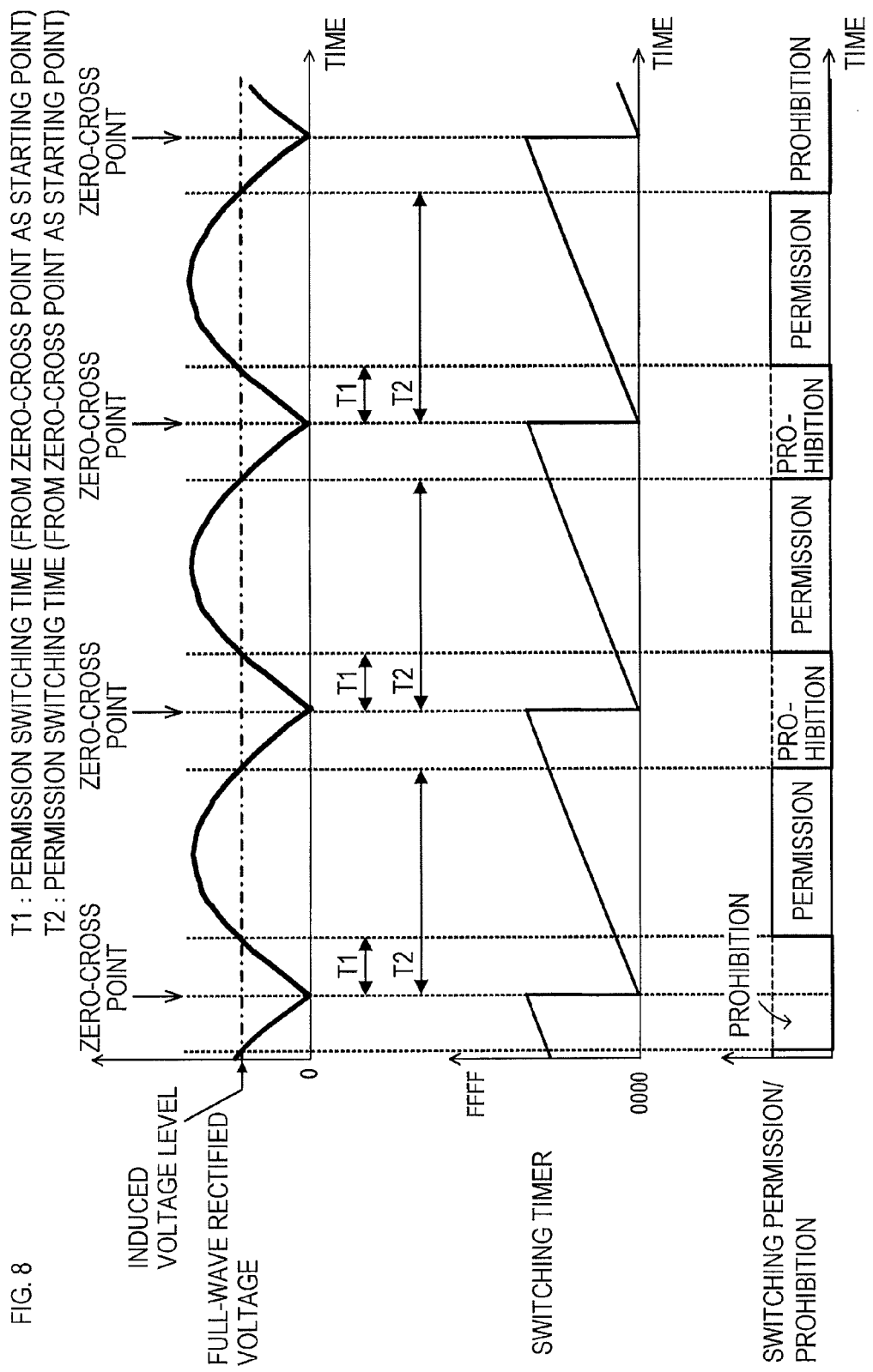
FIG. 8 is an explanatory view illustrating how to determine a permission/prohibition timing of switching output in the third embodiment.

Specifically, as exemplarily shown in FIG. 8, each time a zero-cross point (a point at which the full-wave rectified voltage has a minimum value) of the power supply voltage is detected, the measured time of the switching timer 84 is reset, and time measurement is restarted. The prohibited state of the switching output is maintained from the zero-cross point before the permission switching time T1 has elapsed, and the switching output is permitted when the permission switching time T1 has elapsed. Time measurement is continued thereafter, and the switching output is prohibited when the prohibition switching time T2 has elapsed. Such operation is performed each time a zero-cross point is detected.

As shown in FIG. 7, the permission switching time T1, which is a time period until the increasing full-wave rectified voltage reaches the induced voltage level, is set to be longer as the motor rotation number N becomes larger (that is, the induced voltage becomes higher). In contrast, the prohibition switching time T2, which is a time period until the decreasing full-wave rectified voltage reaches the induced voltage level, is set to be longer as the motor rotation number N becomes smaller (that is, the induced voltage becomes smaller).

The apparatus 70 of the third embodiment is configured to allow determination of the switching prohibition period by the above described third pattern (the combination of Methods A2, B1, and C3).

A description will be given of a switching determination process to be executed by the CPU of the control circuit 72 in the apparatus 70 of the third embodiment in order to permit or prohibit the switching output with reference to FIG. 9.

Figure 9:
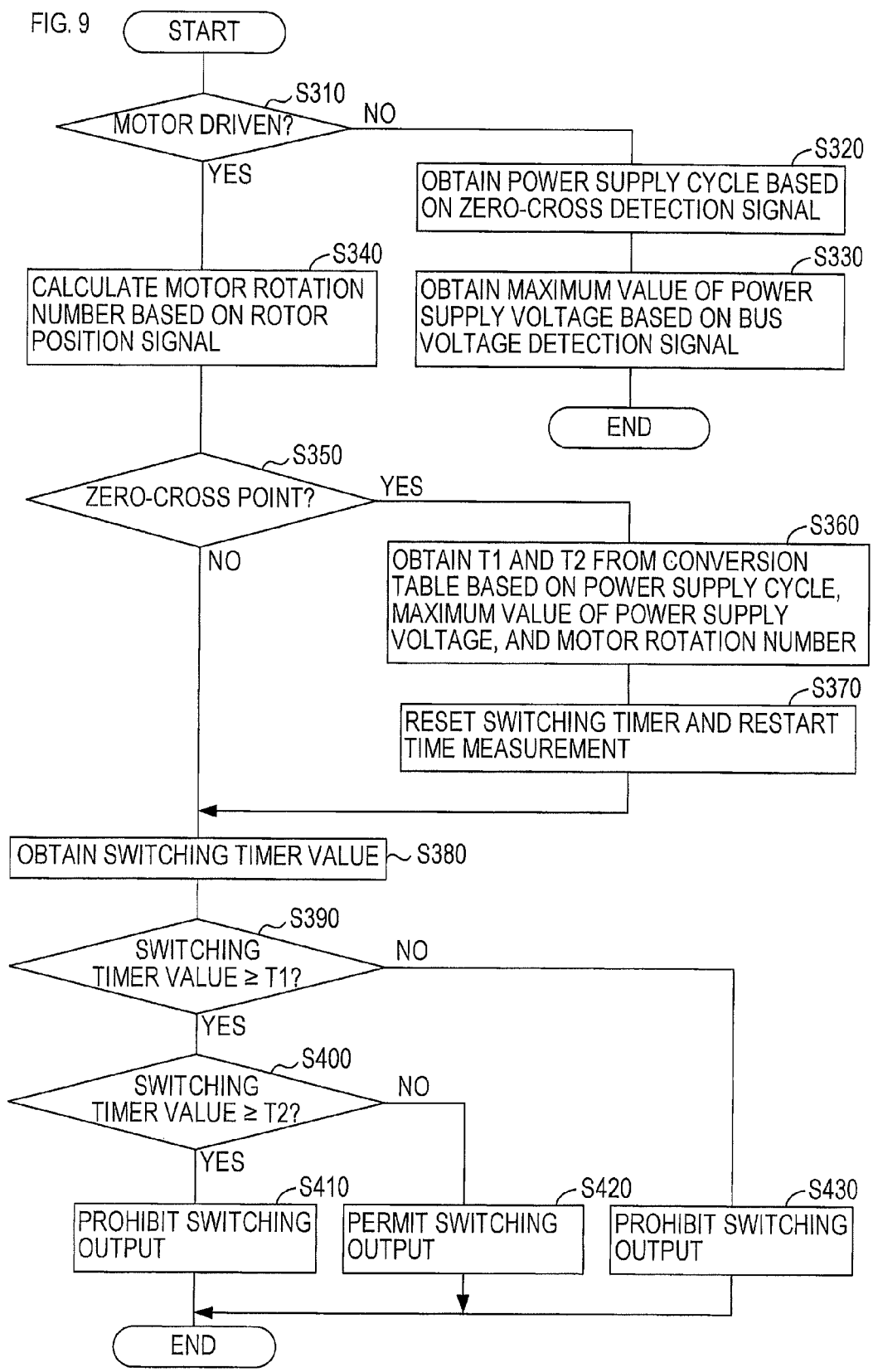
FIG. 9 is a flowchart of a switching determination process in the third embodiment.

When the switching determination process in FIG. 9 is started, the CPU of the control circuit 72 determines in S310 whether the motor 10 is being driven, that is, whether the trigger switch 5 is operated (in a state where the switching control should be performed).

If the motor 10 is not being driven, that is, the trigger switch 5 is off, the present process proceeds to S320. In S320, a power supply cycle is obtained on the basis of a zero-cross detection signal inputted from the zero-cross detection circuit 73. This process in S320 achieves the function of the cycle detector 81. In S330, the maximum value of the power supply voltage is obtained on the basis of the bus voltage detection signal inputted from the bus voltage detection circuit 74. This process in S330 achieves the function of the maximum value detector 82. After the process in S330, the switching determination process in FIG. 9 is terminated.

If it is determined in S310 that the motor 10 is being driven, that is, the trigger switch 5 is operated, the present process proceeds to S340. In S340, in the same manner as in S110 of FIG. 2, a rotor position signal is generated on the basis of respective Hall signals from the rotor position sensors 11, 12, and 13, and a motor rotation number is calculated on the basis of the rotor position signal.

In 5350, it is determined whether a zero-cross point is detected on the basis of the zero-cross detection signal inputted from the zero-cross detection circuit 73. If a zero-cross point is not detected, the present process proceeds to S380, whereas if a zero-cross point is detected, the present process proceeds to S360.

In S360, the permission switching time T1 and the prohibition switching time T2 are obtained from the conversion table 83 on the basis of the power supply cycle, the maximum value of the power supply voltage obtained in S320 and S330 while the trigger switch is off, and the motor rotation number calculated in S340. Specifically, a table corresponding to the power supply cycle and the maximum value of the power supply voltage obtained in S320 and S330 is extracted from among the plurality of tables prepared as the conversion table 83. Then the permission switching time T1 and the prohibition switching time T2 set for the motor rotation number calculated in S340 is obtained from the extracted table. In S370, the switching timer 84 is reset and time measurement is restarted.

In S380, a switching timer value, which is the measured time of the switching timer 84, is obtained. In S390, it is determined whether the switching timer value obtained in S380 is equal to or more than the permission switching time T1. If the switching timer value is smaller than the permission switching time T1, the switching output is prohibited in S430. If the switching timer value is equal to or more than the permission switching time T1, it is determined whether the switching timer value is equal to or more than the prohibition switching time T2 in S400. If the switching timer value is smaller than the prohibition switching time T2, the switching output is permitted in S420. If the switching timer value is equal to or more than the prohibition switching time T2, the switching output is prohibited in S410.

In the apparatus 70 of the third embodiment as described above, magnitude comparison of the full-wave rectified voltage and the induced voltage is not performed. In the third embodiment, the times T1 and T2 corresponding to the motor rotation number are obtained using the conversion table 83, and permission/prohibition of the switching output is determined on the basis of the times T1 and T2. Thus, a timing to permit the switching output and a timing to prohibit the switching output can be easily obtained with a lower processing load.

Other Embodiments

Although some embodiments of the present disclosure have been described above, the present disclosure should not be limited to such embodiments, but may be in various forms.

(1) In the first embodiment, the second full-wave rectifier circuit 17 to detect the second full-wave rectified voltage shares some (diodes D3 and D4) of the four diodes D1, D2, D3, and D4 included in the first full-wave rectifier circuit 16. This configuration is merely an example. For example, a full-wave rectifier circuit that is physically completely independent of the first full-wave rectifier circuit 16 may be separately provided. Any specific configuration of the second full-wave rectifier circuit 17 may be appropriately employed that allows accurate obtainment of the full-wave rectified voltage with reduced influence of disturbance, such as the induced voltage applied to the feed line 15 and the charging capacity of the capacitor C1.

(2) In the first embodiment, the value of the induced voltage calculated by the induced voltage calculator 24 is converted into an analog signal by the D/A converter. This configuration is merely an example. For example, it may be configured such that a PWM signal based on the calculated value of the induced voltage is outputted, and is then smoothed through a low pass filter to generate an analog signal corresponding to the value of the induced voltage.

(3) In the third embodiment, a peak hold circuit may be provided to detect a maximum value of the power supply voltage even while the trigger switch 5 is on (that is, while the motor is being driven). While the motor is driven, an induced voltage is generated in the motor 10 but has a value smaller than the maximum value of the power supply voltage; accordingly, the maximum value of the power supply voltage can be detected with the peak hold circuit.

(4) In each of the above embodiments, a specific method of forcibly stopping the switching operation of the inverter circuit 18 while the full-wave rectified voltage is smaller than the induced voltage is a method of prohibiting the switching output, that is, forcibly stopping the switching control by the switching controller 27, to thereby stop output of a drive signal to the inverter circuit 18. This method is merely an example. For example, a switch may be provided on a transmission path of a drive signal from the control circuit to the inverter circuit 18 to allow interruption of transmission of the drive signal to the inverter circuit 18 by turning off the switch.

(5) In each of the above embodiments, the control circuit is actuated when the power supply voltage is supplied from the external commercial power source 100. The control circuit may be configured to be actuated when the power supply voltage is supplied and also a specific operation is performed. For example, the control circuit may be configured to operate while the trigger switch 5 is being operated.

(6) An element, a circuit, or the like may be provided upstream from a connection point of the capacitor C1 in the feed line 15. For example, a semiconductor switch may be provided to protect a power source by interrupting the feed line 15 when the inverter circuit 18 fails.

In this case, it may be configured such that while the feed line 15 is interrupted by the semiconductor switch, a value of a voltage at a specified point of the feed line 15 upstream from the semiconductor switch is obtained as a value of the full-wave rectified voltage, and such that the timing of permission/prohibition of the switching output is determined on the basis of the obtained value of the voltage (the full-wave rectified voltage) on the feed line 15.

In other words, the value of the full-wave rectified voltage, which is necessary information to determine the timing of permission/prohibition of the switching output, need not always be obtained from a point other than that in the feed line 15. As long as the value of the full-wave rectified voltage can be accurately obtained without being affected by the induced voltage or a charging voltage of the capacitor C1, as in the above-described example of providing a semiconductor switch, a value of a voltage at a specific point of the feed line 15 may be obtained as the value of the full-wave rectified voltage.

(7) In each of the above embodiments, an example is shown where the motor 10 includes the rotor position sensors 11, 12, and 13; however, the present disclosure may be applied to a brushless motor that is so-called a sensor-less motor without a rotor position sensor.

(8) In each of the above embodiments, an example is shown where the present disclosure is applied to a motor-driven apparatus configured as a driver drill; however, the present disclosure may be applied to an electric power tool other than a driver drill or to various motor-driven apparatuses configured as electric working machines, such as an electric grass cutter. The present disclosure may be applied broadly to any type of motor-driven apparatus configured such that an alternating-current power supply voltage is full-wave rectified and the full-wave rectified voltage is supplied to a brushless motor by switching operation.

(9) Further, a function served by a single element in any of the above embodiments may be divided to a plurality of elements, or functions served by a plurality of elements may be integrated into a single element. Also, at least part of the configuration of any of the above embodiments may be replaced with a publicly known configuration having the same function. Part of the configuration of any of the above embodiments may be omitted. At least part of the configuration of any one of the above embodiments may be added to or replaced with the configuration of another one of the above embodiments. Any form that is included in the technical idea, which should be defined only by the language of the claims, may be an embodiment of the present disclosure.

What is claimed is:

1. A motor-driven apparatus comprising:
    a brushless motor comprising a plurality of phases and a plurality of coils, each of the plurality of coils corresponding to a different one of the plurality of phases;
    a full-wave rectifier circuit configured to full-wave rectify an alternating-current power supply voltage supplied from an alternating-current power source provided external to the motor-driven apparatus, to thereby generate a full-wave rectified voltage, and to output the full-wave rectified voltage to a supply path to the plurality of coils;
    a drive circuit comprising a plurality of switching elements provided on the supply path and coupled to the full-wave rectifier circuit through the supply path, the drive circuit being configured to apply the full-wave rectified voltage outputted to the supply path to the plurality of coils through a switching operation of the plurality of switching elements;
    a controller configured to perform a switching control to execute the switching operation of the plurality of switching elements when a drive instruction is inputted to the motor-driven apparatus, to thereby drive the brushless motor; and
    a forcible stop unit configured to perform a forcible stop control to temporarily forcibly stop the switching operation of the plurality of switching elements during a stop period when the full-wave rectified voltage is smaller than an induced voltage generated by the plurality of coils and the switching operation of the plurality of switching elements is to be stopped.

2. The motor-driven apparatus according to claim 1, further comprising:
    a first obtainment unit configured to obtain a voltage value in the supply path, and to obtain rectified voltage information representing the full-wave rectified voltage at least on the basis of the obtained voltage value; and
    a second obtainment unit configured to obtain induced voltage information representing the induced voltage that is applied to the supply path,
    wherein the forcible stop unit is configured to perform the forcible stop control on the basis of the rectified voltage information obtained by the first obtainment unit and the induced voltage information obtained by the second obtainment unit.

3. The motor-driven apparatus according to claim 2, wherein the first obtainment unit is configured to obtain the voltage value of any specific point that is not affected by the induced voltage in the supply path.

4. The motor-driven apparatus according to claim 3,
    wherein the first obtainment unit comprises another full-wave rectifier circuit configured to full-wave rectify the power supply voltage to generate another full-wave rectified voltage, but not to apply the another full-wave rectified voltage to the supply path, and
    wherein the forcible stop unit is configured to obtain the another full-wave rectified voltage as the rectified voltage information, and to perform the forcible stop control on the basis of the obtained rectified voltage information and the induced voltage information obtained by the second obtainment unit.

5. The motor-driven apparatus according to claim 3,
    wherein the first obtainment unit comprises:
        a zero-cross detector configured to detect a zero-cross point of the full-wave rectified voltage included in the rectified voltage information; and
        a maximum value detector configured to detect a rectified voltage maximum value included in the rectified voltage information, the rectified voltage maximum value being a maximum value of the full-wave rectified voltage when the brushless motor is not rotating,
    wherein the forcible stop unit comprises a cycle calculator configured to calculate a cycle of the power supply voltage on the basis of the zero-cross point detected by the zero-cross detector, and
    wherein the forcible stop unit is configured to perform the forcible stop control on the basis of the cycle calculated by the cycle calculator, the rectified voltage maximum value detected by the maximum value detector, and the induced voltage information obtained by the second obtainment unit.

6. The motor-driven apparatus according to claim 3,
    wherein the second obtainment unit comprises:
        a rotation speed detector configured to detect a rotation speed of the brushless motor; and
        an induced voltage calculator configured to calculate a value of the induced voltage on the basis of the rotation speed detected by the rotation speed detector, and
    wherein the forcible stop unit is configured to perform the forcible stop control on the basis of the rectified voltage information obtained by the first obtainment unit and the value of the induced voltage calculated by the induced voltage calculator.

7. The motor-driven apparatus according to claim 3,
wherein the second obtainment unit comprises a phase voltage combination unit configured to parallelly combine respective voltages on respective paths from the drive circuit to the plurality of coils, and to output a phase voltage combined value, which is a value of the combined voltage,
wherein the forcible stop unit is configured to obtain, as the induced voltage information, the phase voltage combined value outputted from the phase voltage combination unit in the stop period each time the stop period starts, and
wherein the forcible stop unit is further configured to recognize a stop cancellation timing on the basis of the obtained induced voltage information, to stop the forcible stop control at the stop cancellation timing, to subsequently recognize a stop execution timing on the basis of the induced voltage information obtained before the stop cancellation timing, and to perform the forcible stop control at the stop execution timing, the stop cancellation timing being a timing when the full-wave rectified voltage becomes equal to or more than the induced voltage and the forcible stop control is to be stopped, and the stop execution timing being a timing when the full-wave rectified voltage becomes lower than the induced voltage and the forcible stop control is to be performed.

8. The motor-driven apparatus according to claim 3,
wherein the first obtainment unit is configured to output a full-wave rectified signal, which is an analog signal having a voltage value that corresponds to a value of the full-wave rectified voltage represented by the rectified voltage information,
wherein the second obtainment unit is configured to output an induced voltage signal, which is an analog signal having a voltage value that corresponds to a value of the induced voltage represented by the induced voltage information,
wherein the motor-driven apparatus further comprises a comparator circuit configured to compare the voltage value of the full-wave rectified signal and the voltage value of the induced voltage signal, and to output a signal indicating a comparison result, and
wherein the forcible stop unit is configured to perform the forcible stop control on the basis of the signal outputted from the comparator circuit.

9. The motor-driven apparatus according to claim 3,
wherein the first obtainment unit is configured to generate full-wave rectified data, which is a digital value indicating a value of the full-wave rectified voltage represented by the rectified voltage information,
wherein the second obtainment unit is configured to generate induced voltage data, which is a digital value indicating a value of the induced voltage represented by the induced voltage information, and
wherein the forcible stop unit comprises a data comparison unit to compare the value indicated by the full-wave rectified data and the value indicated by the induced voltage data, and is configured to perform the forcible stop control on the basis of a comparison result by the data comparison unit.

10. The motor-driven apparatus according to claim 3, further comprising:
a table to determine stop period information representing the stop period in one cycle of the power supply voltage on the basis of the rectified voltage information and the induced voltage information, the table storing the rectified voltage information and the induced voltage information in association with the stop period information,
wherein the forcible stop unit is configured to obtain the stop period information that is associated with the rectified voltage information and the induced voltage information on the basis of the table, and to perform the forcible stop control in accordance with the stop period information.

11. The motor-driven apparatus according to claim 10,
wherein the first obtainment unit comprises a zero-cross detector configured to detect a zero-cross point of the full-wave rectified voltage included in the rectified voltage information,
wherein the table includes at least a cancellation execution period and a stop execution period as the stop period information, the cancellation execution period being a time period from the zero-cross point of the full-wave rectified voltage until a timing to cancel forcible stop of the switching operation, and the stop execution period being a time period until a timing to perform forcible stop of the switching operation again after the cancellation execution period has elapsed since the zero-cross point of the full-wave rectified voltage, and
wherein the forcible stop unit is configured to obtain the cancellation execution period and the stop execution period that are associated with the rectified voltage information and the induced voltage information in the table each time the zero-cross point is detected by the zero-cross detector, and to perform the forcible stop control on the basis of the obtained cancellation execution period and stop execution period using the detected zero-cross point as a starting point.

12. A method for driving a motor-driven apparatus with a brushless motor, the brushless motor comprising a plurality of phases and a plurality of coils, each of the plurality of coils corresponding to a different one of the plurality of phases, the method comprising:
obtaining an alternating-current power supply voltage from an alternating-current power source provided external to the motor-driven apparatus;
full-wave rectifying the obtained power supply voltage to generate a full-wave rectified voltage;
outputting the full-wave rectified voltage to a supply path to the plurality of coils;
switching a plurality of switching elements provided on the supply path such that the full-wave rectified voltage is applied to the plurality of coils through the plurality of switching elements when a drive instruction is inputted to the motor-driven apparatus; and
temporarily stopping the switching of the plurality of switching elements during a stop period when the full-wave rectified voltage is smaller than an induced voltage generated by the plurality of coils and the switching of the plurality of switching elements is to be stopped.

* * * * *